United States Patent
Flori et al.

(10) Patent No.: US 11,065,534 B1
(45) Date of Patent: Jul. 20, 2021

(54) THUMBSTICK USER INPUT DEVICE AND RELATED METHODS

(71) Applicant: Apple Inc., Cupertino, CA (US)

(72) Inventors: Caleb J. Flori, Cupertino, CA (US); Colin J. Abraham, Mountain View, CA (US); Min C. Kim, San Jose, CA (US); Xuan Liu, Cupertino, CA (US); Joshua J. Pong, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/915,389

(22) Filed: Jun. 29, 2020

(51) Int. Cl.
*A63F 13/24* (2014.01)

(52) U.S. Cl.
CPC ...... *A63F 13/24* (2014.09); *A63F 2300/1043* (2013.01)

(58) Field of Classification Search
CPC ........... G05G 1/02; G05G 1/025; G05G 1/04; G05G 1/06; G05G 1/10; G05G 1/12; G05G 5/05; G05G 9/047; G05G 2009/04703; G05G 2009/04474; G05G 2009/04744; G05G 2009/04748; G05G 2009/04755; H01H 25/04; H01H 3/02; H01H 3/04; H01H 3/12; H01H 3/122; H01H 3/46; H01H 2003/127; H01H 13/14; A63F 13/245; A63F 13/24; A63F 2300/10; A63F 2300/1043
See application file for complete search history.

(56) References Cited

U.S. PATENT DOCUMENTS

| | | | |
|---|---|---|---|
| 7,061,466 B1 | 6/2006 | Moore et al. | |
| 2005/0034965 A1* | 2/2005 | Uehira | G05G 1/087 200/341 |
| 2011/0240454 A1* | 10/2011 | Ohshima | G05G 9/047 200/6 A |
| 2017/0001106 A1* | 1/2017 | Gassoway | A63F 13/22 |
| 2017/0368451 A1* | 12/2017 | Tiffany | A63F 13/22 |
| 2018/0200617 A1* | 7/2018 | Tiffany | A63F 13/24 |

* cited by examiner

*Primary Examiner* — Richard W Ridley
*Assistant Examiner* — Brian J McGovern
(74) *Attorney, Agent, or Firm* — Brownstein Hyatt Farber Schreck, LLP

(57) ABSTRACT

A thumbstick user input device may include a shaft carried by a housing and having an upper end extending outwardly beyond the housing for manipulation by the user's thumb and a lower end within the housing. Sensors may be carried by the housing to sense shaft movement. A first contact member may be within the housing, and a spring may be between the first contact member and the shaft to urge the first contact member and the shaft apart. A motor may be carried at a bottom of the housing and may have a rotatable output extending upwardly therefrom. A second contact member may be coupled to the rotatable output and in contact with the first contact member to be selectively moveable upward or downward based upon motor rotation to set a spring compression and thereby set a return-to-center bias for the shaft while being manipulated by the user's thumb.

20 Claims, 7 Drawing Sheets

US 11,065,534 B1

THUMBSTICK USER INPUT DEVICE AND RELATED METHODS

TECHNICAL FIELD

The present disclosure relates to the field of electronics, and, more particularly, to the field of user input devices.

BACKGROUND

A joystick is a type of user input device, for example, for use with a gaming controller. A typical joystick includes a stick or shaft that is moved by a user relative to a center position to provide input, for example, 360-degree control in two dimensions. A joystick may be self-centering, for example, and may return to the center position when user input is removed.

One type of joystick is a thumbstick. Similarly to a joystick, a stick or shaft is moved by a user relative to a center position to provide input. However, unlike a joystick, for example, where the user's hand is engaged with the shaft, a thumbstick includes a relatively short shaft that is operated by the user's thumb. In other words, the shaft is sized so that the user cannot typically move the shaft by engaging the user's whole hand.

SUMMARY

A thumbstick user input device may include a housing and a shaft carried by the housing. The shaft may have an upper end extending outwardly beyond the housing for manipulation by a user's thumb and a lower end within the housing. The thumbstick user input device may also include a plurality of sensors carried by the housing to sense movement of the shaft, and a first contact member within the housing. The thumbstick user input device may also include a spring coupled between the first contact member and the shaft to urge the first contact member and the shaft apart, and a motor carried at a bottom of the housing and having a rotatable output extending upwardly therefrom. A second contact member may be coupled to the rotatable output and in contact with the first contact member to be selectively moveable in an upward or downward direction based upon motor rotation to set a compression of the spring and thereby set a return-to-center bias for the shaft while the upper end of the shaft is being manipulated by the user's thumb.

The spring may include a coil spring, for example. The shaft may have a shaft passageway therethrough, and the first contact member may be slidable within the shaft passageway.

The coil spring may be within the shaft passageway between the first contact member and adjacent portions of the shaft. The first contact member may have a contact member passageway therein, and the coil spring may be within the contact member passageway, for example.

The upper end of the shaft may include a removable thumb contact pad, for example. The thumbstick user input device may also include a controller coupled to the plurality of sensors and the motor. The controller may be configured to set the rotatable output to move the first contact member to a release position for the removable thumb contact pad, for example. The controller may be configured to operate the motor to set the return-to-center bias based upon the plurality of sensors, for example.

A method aspect is directed to a method of making a thumbstick user input device. The method may include mounting a shaft and associated sensors within a housing so that an upper end of the shaft extends outwardly beyond the housing for manipulation by a user's thumb and a lower end of the shaft is within the housing. The method may also include mounting a return-to-center bias arrangement to the shaft. The return-to-center bias arrangement may include a first contact member within the housing, a spring coupled between the first contact member and the shaft to urge the first contact member and the shaft apart, and a motor carried at a bottom of the housing and having a rotatable output extending upwardly therefrom. The return-to-center bias arrangement may also include a second contact member coupled to the rotatable output and in contact with the first contact member to be selectively moveable in an upward or downward direction based upon motor rotation to set a compression of the spring and thereby set a return-to-center bias for the shaft while the upper end of the shaft is being manipulated by the user's thumb.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation is used to indicate similar elements in alternative embodiments.

Figure 1:
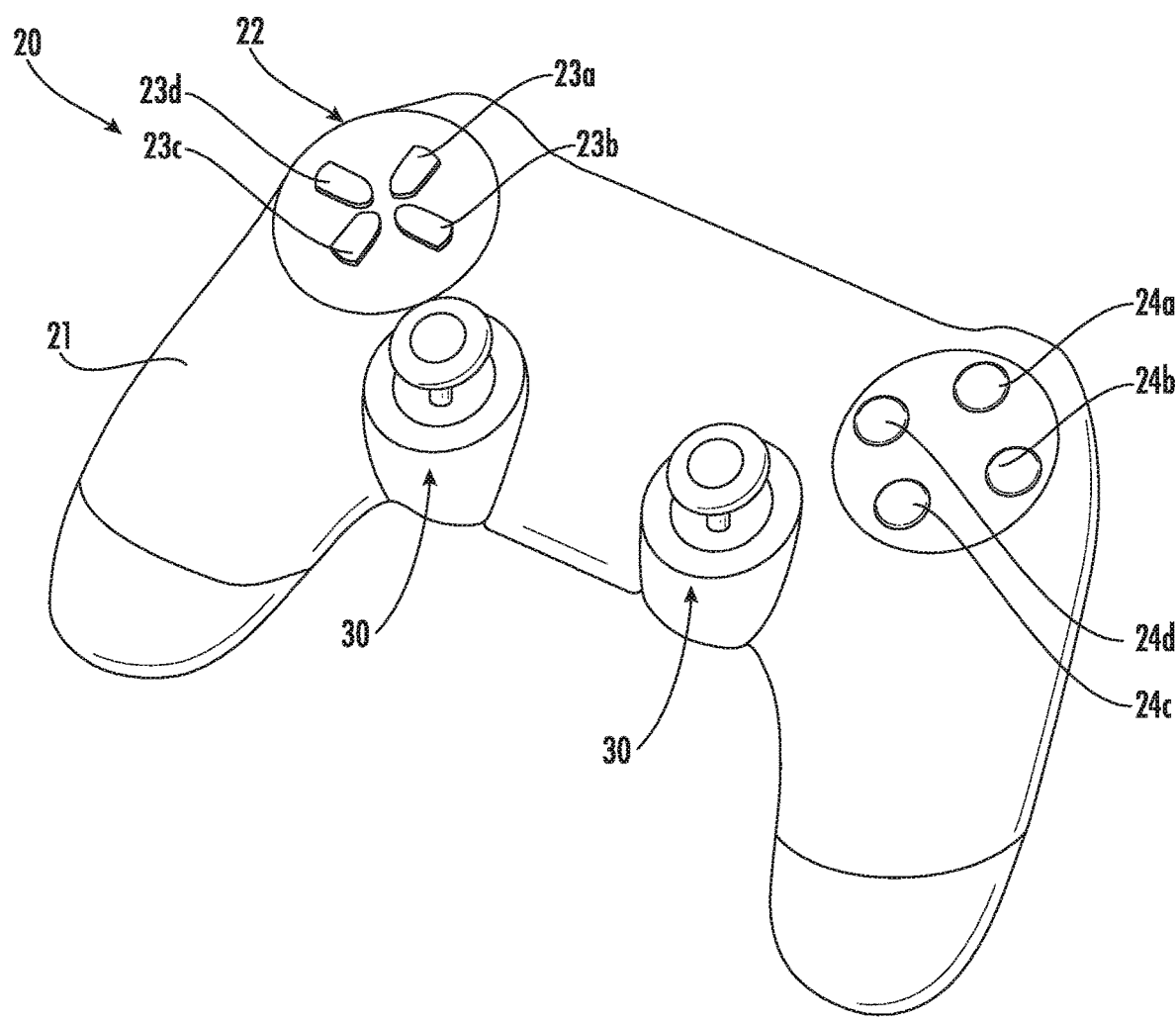
FIG. 1 is a schematic diagram of a game controller including a thumbstick user input device according to an embodiment.

Referring initially to FIG. 1, an input device, illustratively in the form of a gaming controller 20, includes a controller housing 21 and a directional keypad 22 carried by the controller housing. The directional keypad 22 includes discrete pushbuttons 23a-23d corresponding to up, down, left, and right directions. The gaming controller 20 also includes pushbutton input devices 24a-24d carried by the controller housing 21 that may have different functions associated therewith based upon a game being played. The gaming controller 20 also illustratively includes first and second thumbstick user input devices 30 carried by the controller housing 21, for example, for operation by a user's left and right thumbs. Controller circuitry 25 may be carried by the controller housing 21 and may be coupled to the directional keypad 22, pushbutton input device 24a-24d, and thumbstick user input device 30, and may include wireless communications circuitry, for example, for wirelessly communicating with a gaming console.

While two thumbstick user input devices 30 are illustrated, the gaming controller 20 may include any number of thumbstick user input devices. Similarly, there may be any number of pushbutton input devices 24a-24d and a directional keypad 22 may not be included. Moreover, while a gaming controller 20 is described, those skilled in the art will appreciate that, as an input device, the gaming controller may be used for other and/or additional input functions, such as non-gaming functions.

Figure 2:
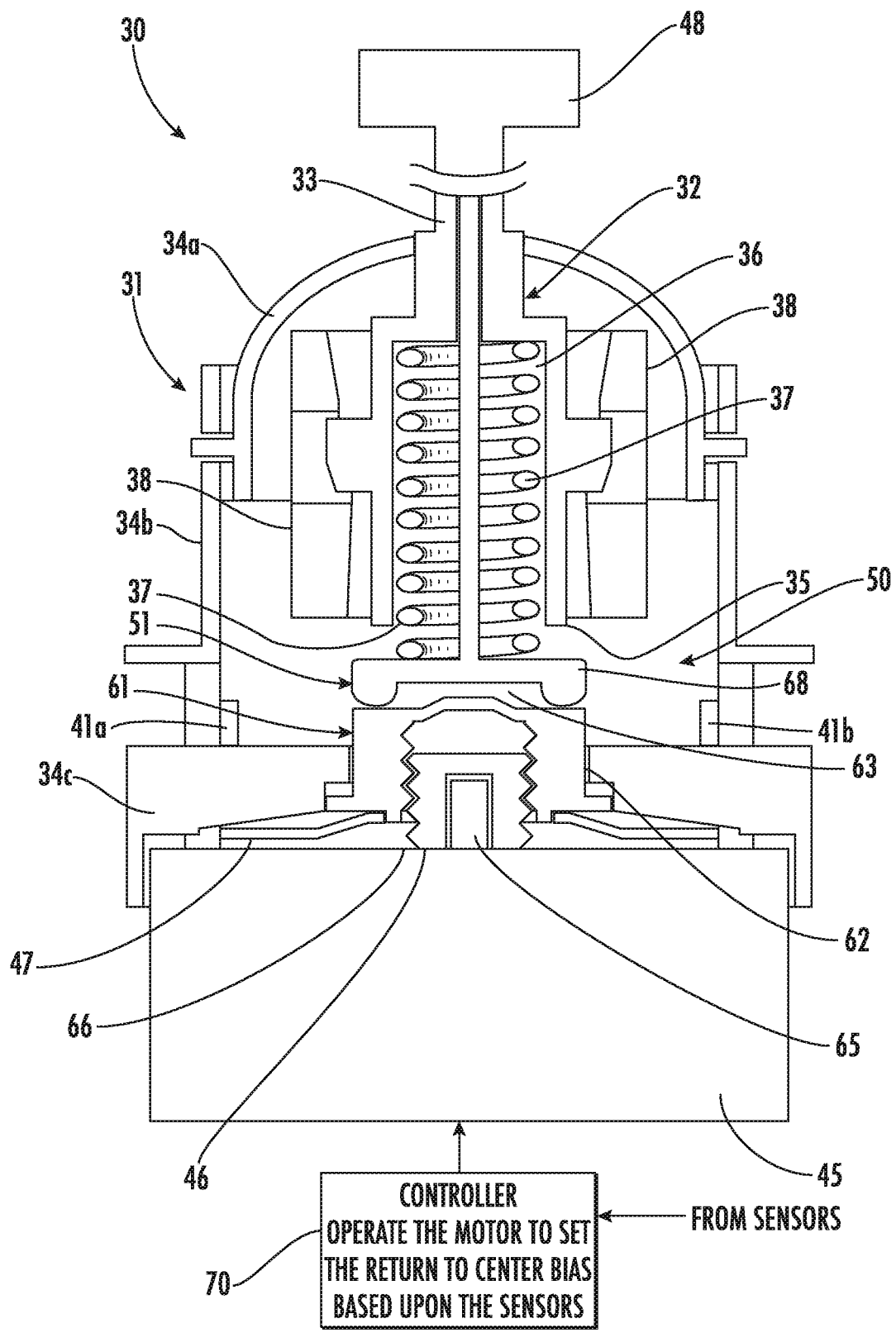
FIG. 2 is a schematic diagram of a thumbstick user input device according to an embodiment.

Referring now additionally to FIG. 2, the thumbstick user devices 30 each include a housing 31. The housing 31 may include multiple portions or segments, for example, a cover 34a, motor housing 34c, and a housing body 34b coupled between the cover and motor housing.

A shaft 32 is carried by the housing 31. The shaft 32 has an upper end 33 that extends outwardly beyond the housing 31, for example, through the cover 34a, for manipulation by the user's thumb. Accordingly, the cover 34a may include a flexible material to permit movement when the shaft 32 is manipulated by a user's thumb.

The shaft 32 has a lower end 35 that is within the housing 31. The shaft 32 has a passageway 36 therethrough. As will be appreciated by those skilled in the art, a thumbstick module or yoke 38 is carried by the shaft 32. The upper end 33 of the shaft 32 has a removable thumb contact pad 48.

Sensors 41a, 41b are carried by the housing 31 to sense movement of the shaft 32. The sensors 41a, 41b may be position sensors, for example, to sense a position or relative motion of the shaft 32. There may be any number of sensors 41a, 41b.

The thumbstick user input device 30 includes a first contact member 51 within the housing 31. More particularly, the first contact member 51, which is part of a return-to-center bias arrangement 50, may be slidable within shaft passageway 36. The first contact member 51 may define an actuator, for example. The first contact member 51 has a lower portion 68, for example, not within the shaft passageway 36, that has a generally flat or rectangular shape and has a slot 67 therein to engage a second contact member 61, as will be described in further detail below.

The thumbstick user input device 30, or more particularly, the return-to-center bias arrangement 50, also includes a spring 37 that is coupled between the first contact member 51 and the shaft 32, and more particularly, within the shaft passageway 36 between the first contact member and adjacent portions of the shaft. The spring 37, which is illustratively in the form of a coil spring, urges the first contact member 51 and the shaft 32 apart. Of course, while a coil spring is described, the spring 37 may be another type of spring. More than one spring may be included.

A motor 45, for example an electric motor, is carried at a bottom of the housing 31. More particularly, the motor 45, which is part of the return-to-center bias arrangement 50, is carried by the motor housing 34c. The motor 45 has a rotatable output 46 extending upwardly therefrom. The rotatable output 46 is illustratively in the form of a motor shaft 65 and threaded bushing 66 that engages the shaft. A biasing member in the form of a balance spring 47 is coupled between the motor 45 and motor housing 34c.

The return-to-center bias arrangement 50 includes the second contact member 61, which is coupled to the rotatable output 46. The second contact member 61 is in contact with the first contact member 51 and is selectively moveable in an upward or downward direction based upon motor rotation to set a compression of the spring 37 and thereby set a return-to-center bias for the shaft 32 while the upper end 33 of the shaft is being manipulated by the user's thumb. The second contact member 61 includes a threaded lead screw 62 and a guide member 63 carried by the threaded lead screw and that engages the lower portion 68 of the first contact member 51 adjacent the slot 67. Operation of the motor 45 causes the threaded shaft or rotatable output 46 of the motor to spin. The rotatable output 46, by way of the threads, engages the threaded lead screw 62 to cause the threaded lead screw and guide member 63 to move in the upward or downward direction.

More particularly, a controller 70 may be coupled to the sensors 41a, 41b and the motor 45. The controller 70 operates the motor to set the return-to-center bias based upon the sensors 41a, 41b. For example, the sensors 41a, 41b may sense movements or manipulation of the upper end 33 of the shaft 32 by the user's thumb. The sensed position of the shaft off-center is provided as an input to the controller 70, which in turn selectively operates the motor 45 to set the return-to-center bias. In other words, operation of the motor 45 sets the appropriate compression so that the shaft 32 returns to the center position.

Figure 3:
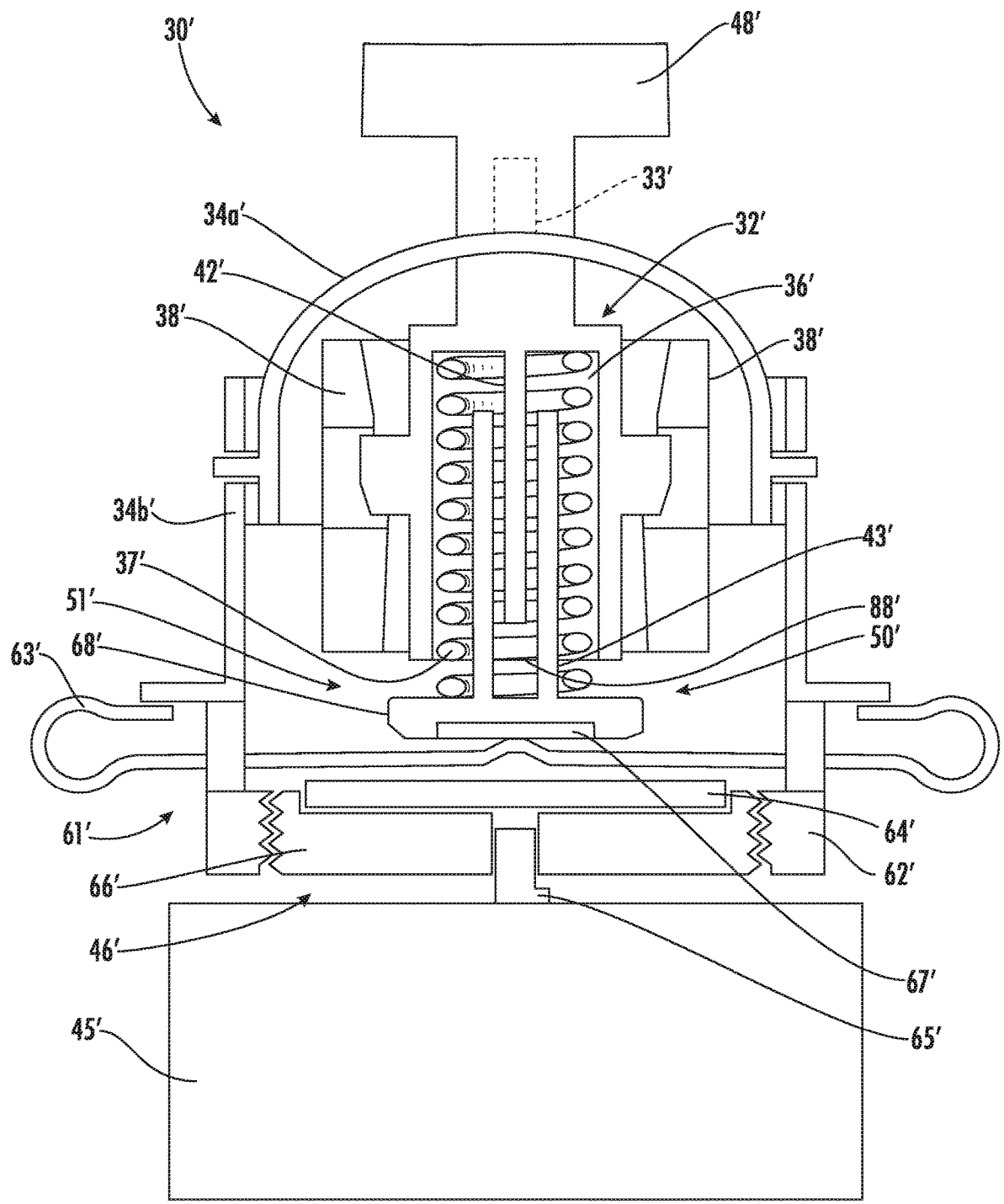
FIG. 3 is a schematic diagram of a thumbstick user input device according to another embodiment.

Referring now to FIG. 3, in another embodiment, the shaft 32' may include a further shaft 42' within the shaft passageway 36'. The first contact member 51' may include a sleeve 43' defining a contact member passageway 88' that slides over the further shaft 42'. The spring 37' surrounds the further shaft 42' and the sleeve 43' within the shaft passageway 36'. The first contact member 51' has a lower portion 68', for example, not within the shaft passageway 36', that has a generally flat or rectangular shape and has a slot 67' therein to engage the second contact member 61'.

The second contact member 61' is coupled to the rotatable output 46', which is in the form of a motor shaft 65' and threaded bushing 66' that engages the shaft. A cover 64' is carried by the threaded bushing 66' over the motor shaft 65'. The second contact member 61' is in contact with the first contact member 51' and is selectively moveable in an upward or downward direction based upon motor rotation to set a compression of the spring 37' and thereby set a return-to-center bias for the shaft 32' while the upper end 33' of the shaft is being manipulated by the user's thumb. The second contact member 61', similarly to the embodiments described above, includes a threaded lead screw 62' and a guide member 63' carried by the threaded lead screw. However, in the present embodiments, the threaded lead screw 62' and a guide member 63' have a diameter or are sized larger the embodiments described above. Similar to the embodiments described above, operation of the motor 45' causes the threaded shaft or rotatable output 46' of the motor to spin. The rotatable output 46', by way of the threads, engages the threaded lead screw 62' to cause the threaded lead screw, and thus the guide member 63' in the upward or downward direction. Elements illustrated but not specifically described are similar to those described above.

Figure 4:
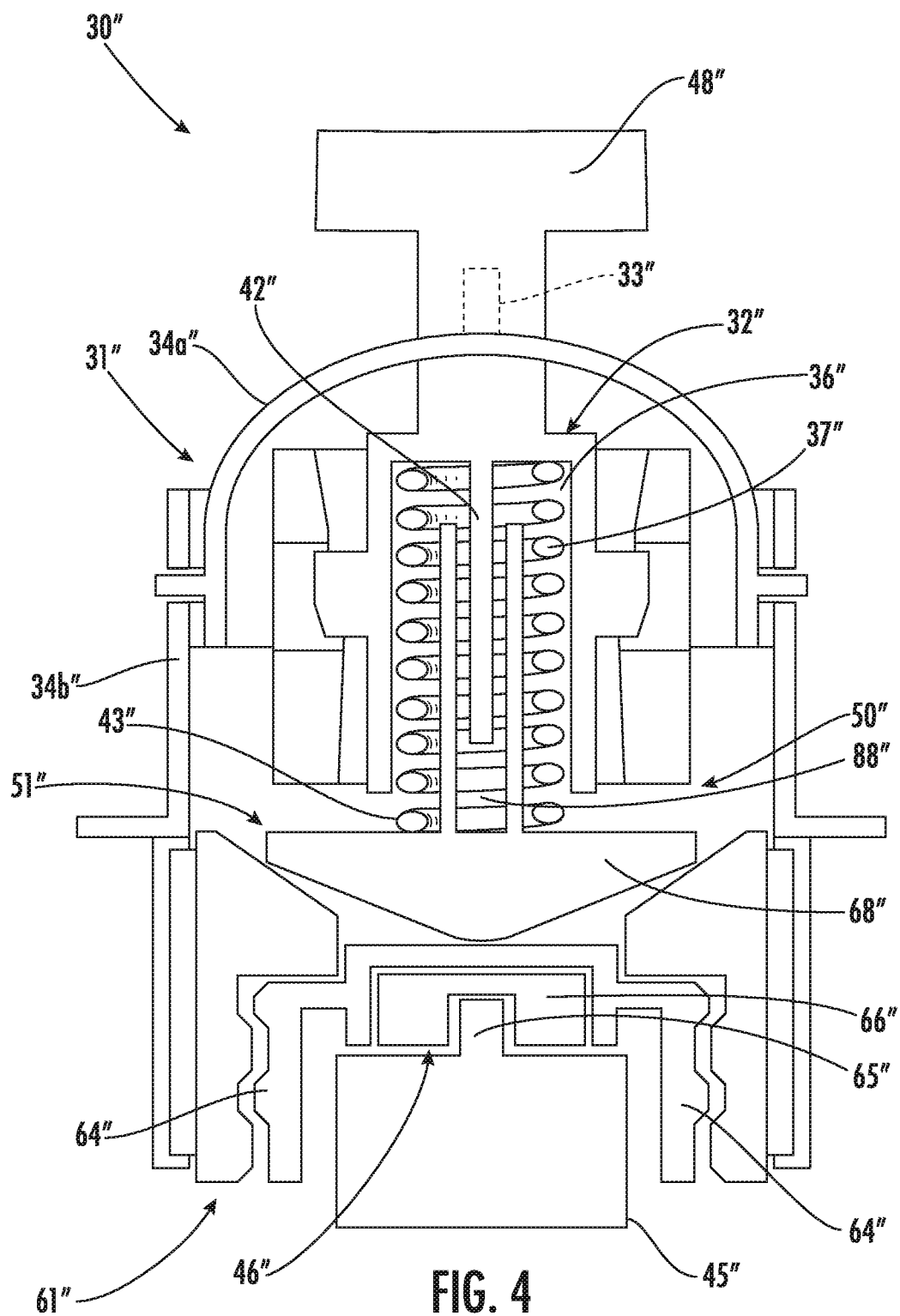
FIG. 4 is a schematic diagram of a thumbstick user input device according to another embodiment.

Referring now to FIG. 4, in another embodiment, the shaft 32" may include a further shaft 42" within the shaft passageway 36". The first contact member 51" may include a sleeve 43" defining a contact member passageway 88" that slides over the further shaft 42". The spring 37" surrounds the further shaft 42" and the sleeve 43" within the shaft passageway 36". The first contact member 51" has a lower portion 68", for example, not within the shaft passageway 36', that has a generally inverted trapezoidal cross-sectional shape.

The second contact member 61" is coupled to the rotatable output 46", which is in the form of a motor shaft 65" and bushing 66", which may be threaded, that engages the motor shaft. A cover 64" is carried by the bushing 66" over the motor shaft 65". The second contact member 61" engages the cover 64" and has a frusto-conical shape defining a cavity to receive the lower portion 68" of the first contact member 51" therein. The second contact member 61" is in contact with the first contact member 51", and more particularly, the lower portion 68", and is selectively moveable in an upward or downward direction based upon motor rotation to set a compression of the spring 37" and thereby set a return-to-center bias for the shaft 32" while the upper end 33" of the shaft is being manipulated by the user's thumb. Elements illustrated but not specifically described are similar to those described above.

Figure 5:
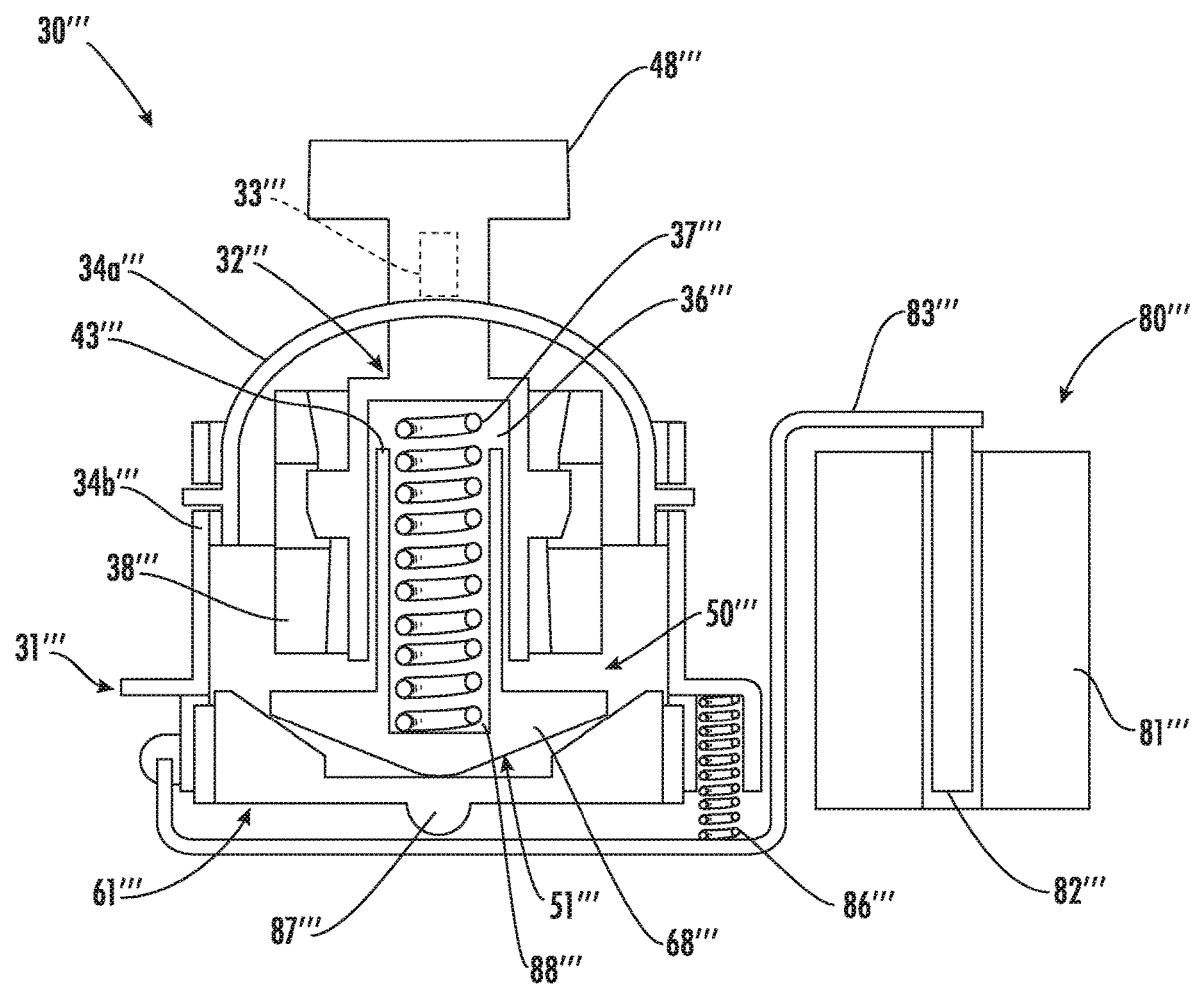
FIG. 5 is a schematic diagram of a thumbstick user input device according to another embodiment.

Referring now to FIG. 5, in another embodiment, the first contact member 51'" has a contact member passageway 88'", for example, defined by a sleeve 43'", similar to the embodiments described above. The spring or coil spring 37'" is within the contact member passageway 88'".

The lower portion 68'" of the first contact member 51'" is shaped similarly to the first contact member described above with respect to FIG. 4. Moreover, the second contact member 61'" is also shaped similarly to the second contact member 61" described above with respect to FIG. 4. The present second contact member 61'", however, includes a protrusion 87'" on a bottom side or side opposite from where it engages with the first contact member 51'".

Instead of a motor, the thumbstick user input device 30'" of the present embodiments may include a solenoid 80'". Operation of an electromagnet 81'" causes a shaft 82'" to extend. A bracket 83'" is coupled between the shaft 82'" and the protrusion 87'". The bracket 83'" is also hingeably coupled to the housing 31'" and biased from the housing by way of a bracket spring 86'" so that operation of the solenoid 80'" or extension of the shaft 82'" causes compression of the bracket spring 86'" and the bracket to engage the protrusion 87'". In other words, by way of operation of the solenoid 80'", the first contact member 51'" is selectively moveable in an upward or downward direction to set a compression of the spring 37'" and thereby set a return-to-center bias for the shaft 32'" while the upper end 33'" of the shaft is being manipulated by the user's thumb. Elements illustrated but not specifically described are similar to those described above.

Figure 6A:
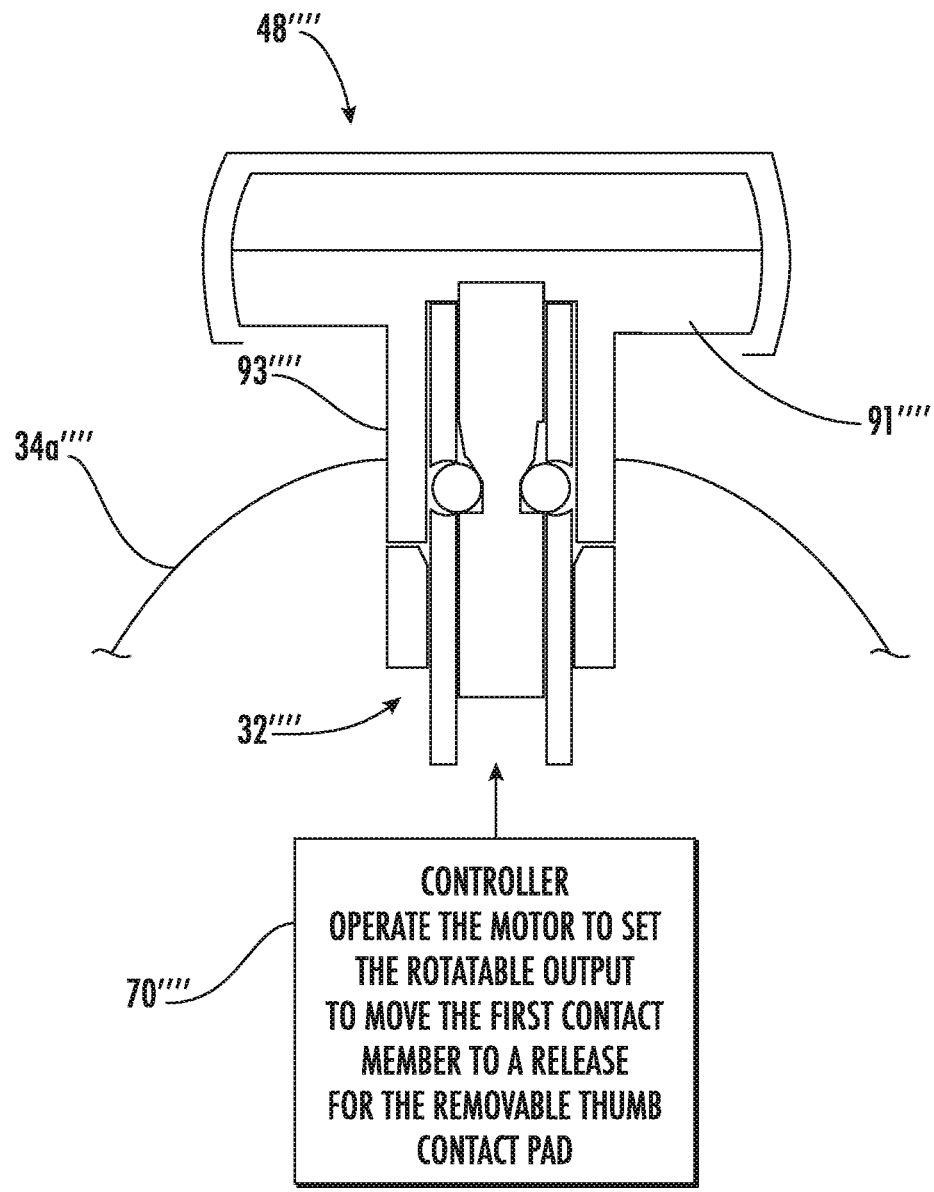
FIG. 6a is a schematic diagram of a portion of a thumbstick user input device including a removable thumb contact pad in accordance with an embodiment.
Figure 6B:
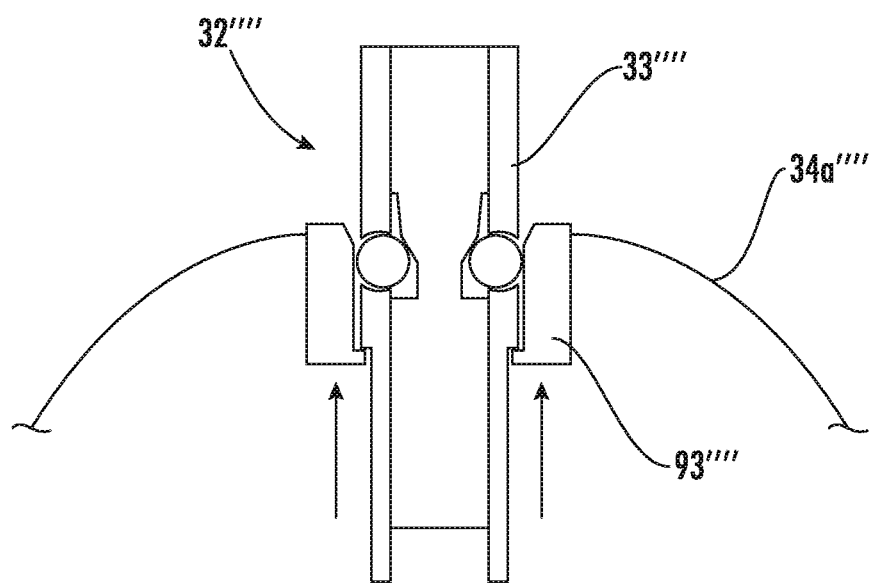
FIG. 6b is a schematic diagram of the portion of the thumbstick user input device of FIG. 6a with the removable thumb contact pad removed.

Referring now to FIGS. 6a and 6b, in another embodiment, the controller 70"" may operate the motor to set the rotatable output 46"" to move the first contact member 51"" to a release position for the removable thumb contact pad 48"". Operation of the motor releases detent bodies 93"" so that the removable thumb contact pad 48"" is positioned to a secondary retention. A user, for example, may then manually remove or separate the removable thumb contact pad 48"" from the upper end 33"" of the shaft 32"". A cover may provide a cap to the opening where the removable thumb contact pad 48"" is coupled to the shaft 32"". To replace the removable thumb contact pad 48"", the user may press the removable thumb contact pad 48"" into the opening to engage the detent bodies 93"". Elements illustrated but not specifically described are similar to those described above.

A method aspect is directed to a method of making a thumbstick user input device 30. The method includes mounting a shaft 32 and associated sensors 41a, 41b within a housing 31 so that an upper end 33 of the shaft extends outwardly beyond the housing for manipulation by a user's thumb and a lower end 35 of the shaft is within the housing. The method also includes mounting a return-to-center bias arrangement 50 to the shaft 32. The return-to-center bias arrangement 50 includes a first contact member 51 within the housing 31, a spring 37 coupled between the first contact member and the shaft 32 to urge the first contact member and the shaft apart, and a motor 45 carried at a bottom of the housing and having a rotatable output 46 extending upwardly therefrom. The return-to-center bias arrangement 50 also includes a second contact member 61 coupled to the rotatable output 46 and in contact with the first contact member 51 to be selectively moveable in an upward or downward direction based upon motor rotation to set a compression of the spring 37 and thereby set a return-to-center bias for the shaft 32 while the upper end 33 of the shaft is being manipulated by the user's thumb.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A thumbstick user input device comprising:
   a housing;
   a shaft carried by the housing and having an upper end extending outwardly beyond the housing for manipulation by a user's thumb and a lower end within the housing;
   a plurality of sensors carried by the housing to sense movement of the shaft;
   a first contact member within the housing;
   a spring coupled between the first contact member and the shaft to urge the first contact member and the shaft apart;
   a motor carried at a bottom of the housing and having a rotatable output extending upwardly therefrom; and
   a second contact member coupled to the rotatable output and in contact with the first contact member to be selectively moveable in an upward or downward direction based upon motor rotation to set a compression of the spring and thereby set a return-to-center bias for the shaft while the upper end of the shaft is being manipulated by the user's thumb.

2. The thumbstick user input device according to claim 1 wherein the spring comprises a coil spring.

3. The thumbstick user input device according to claim 2 wherein the shaft has a shaft passageway therethrough; and wherein the first contact member is slidable within the shaft passageway.

4. The thumbstick user input device according to claim 3 wherein the coil spring is within the shaft passageway between the first contact member and adjacent portions of the shaft.

5. The thumbstick user input device according to claim 3 wherein the first contact member has a contact member passageway therein; and wherein the coil spring is within the contact member passageway.

6. The thumbstick user input device according to claim 1 wherein the upper end of the shaft comprises a removable thumb contact pad.

7. The thumbstick user input device according to claim 6 comprising a controller coupled to the plurality of sensors and the motor; and wherein the controller is configured to set the rotatable output to move the first contact member to a release position for the removable thumb contact pad.

8. The thumbstick user input device according to claim 1 comprising a controller coupled to the plurality of sensors and the motor; and wherein the controller is configured to operate the motor to set the return-to-center bias based upon the plurality of sensors.

9. A thumbstick user input device comprising:
a housing;
a shaft carried by the housing and having an upper end extending outwardly beyond the housing for manipulation by a user's thumb and a lower end within the housing;
a plurality of sensors carried by the housing to sense movement of the shaft;
a first contact member within the housing;
a coil spring coupled between the first contact member and the shaft to urge the first contact member and the shaft apart;
a motor carried at a bottom of the housing and having a rotatable output extending upwardly therefrom;
a second contact member coupled to the rotatable output and in contact with the first contact member to be selectively moveable in an upward or downward direction based upon motor rotation to set a compression of the coil spring and thereby set a return-to-center bias for the shaft while the upper end of the shaft is being manipulated by the user's thumb; and
a controller coupled to the plurality of sensors and the motor, and configured to operate the motor to set the return-to-center bias based upon the plurality of sensors.

10. The thumbstick user input device according to claim 9 wherein the shaft has a shaft passageway therethrough and wherein the first contact member is slidable within the shaft passageway.

11. The thumbstick user input device according to claim 10 wherein the coil spring is within the shaft passageway between the first contact member and adjacent portions of the shaft.

12. The thumbstick user input device according to claim 10 wherein the first contact member has a contact member passageway therein; and wherein the coil spring is within the contact member passageway.

13. The thumbstick user input device according to claim 9 wherein the upper end of the shaft comprises a removable thumb contact pad.

14. The thumbstick user input device according to claim 13 wherein the controller is configured to set the rotatable output to move the first contact member to a release position for the removable thumb contact pad.

15. A method of making a thumbstick user input device comprising:
mounting a shaft and associated sensors within a housing so that an upper end of the shaft extends outwardly beyond the housing for manipulation by a user's thumb and a lower end of the shaft is within the housing; and
mounting a return-to-center bias arrangement to the shaft comprising
a first contact member within the housing,
a spring coupled between the first contact member and the shaft to urge the first contact member and the shaft apart,
a motor carried at a bottom of the housing and having a rotatable output extending upwardly therefrom, and
a second contact member coupled to the rotatable output and in contact with the first contact member to be selectively moveable in an upward or downward direction based upon motor rotation to set a compression of the spring and thereby set a return-to-center bias for the shaft while the upper end of the shaft is being manipulated by the user's thumb.

16. The method according to claim 15 wherein the spring comprises a coil spring.

17. The method according to claim 16 wherein the shaft has a shaft passageway therethrough; and wherein the first contact member is slidable within the shaft passageway.

18. The method according to claim 17 wherein the coil spring is within the shaft passageway between the first contact member and adjacent portions of the shaft.

19. The method according to claim 17 wherein the first contact member has a contact member passageway therein; and wherein the coil spring is within the contact member passageway.

20. The method according to claim 15 wherein the upper end of the shaft comprises a removable thumb contact pad; and wherein the motor is for setting the rotatable output to move the first contact member to a release position for the removable thumb contact pad.

* * * * *